(12) United States Patent
Asplund

(10) Patent No.: US 8,422,257 B2
(45) Date of Patent: Apr. 16, 2013

(54) VOLTAGE SOURCE CONVERTER

(75) Inventor: Gunnar Asplund, Ludvika (SE)

(73) Assignee: ABB Technology AG, Zurich (CH)

( * ) Notice: Subject to any disclaimer, the term of this patent is extended or adjusted under 35 U.S.C. 154(b) by 362 days.

(21) Appl. No.: 12/997,126

(22) PCT Filed: Jun. 9, 2008

(86) PCT No.: PCT/EP2008/057154
§ 371 (c)(1),
(2), (4) Date: Dec. 9, 2010

(87) PCT Pub. No.: WO2009/149743
PCT Pub. Date: Dec. 17, 2009

(65) Prior Publication Data
US 2011/0096580 A1    Apr. 28, 2011

(51) Int. Cl.
*H02M 5/08* (2006.01)
(52) U.S. Cl.
USPC .............................. 363/71; 363/35; 363/43
(58) Field of Classification Search ............ 363/71, 363/35, 51, 43, 41
See application file for complete search history.

(56) References Cited

U.S. PATENT DOCUMENTS

| | | | |
|---|---|---|---|
| 5,642,275 A | 6/1997 | Peng et al. | |
| 2003/0214824 A1* | 11/2003 | Corzine | 363/71 |
| 2008/0205093 A1 | 8/2008 | Davies et al. | |
| 2008/0232145 A1* | 9/2008 | Hiller et al. | 363/56.01 |
| 2009/0080225 A1* | 3/2009 | Dijkhuizen | 363/65 |

FOREIGN PATENT DOCUMENTS

| | | |
|---|---|---|
| DE | 101 03 031 A1 | 7/2002 |
| WO | WO 2007/023064 A1 | 3/2007 |
| WO | WO 2007/028349 A1 | 3/2007 |

OTHER PUBLICATIONS

Gilje et al., "Valhall Re-Development Project, Power From Shore", Energex 2006, 11th International Energy Conference & Exhibition, Stavanger, Norway, Jun. 12, 2006, XP-002513306, pp. 1-6.
Glinka et al., "A New AC/AC-Multilevel Converter Family Applied to a Single-Phase Converter", Power Electronics and Drive Systems, The Fifth International Conference on Singapore, vol. 1, Nov. 17-20, 2003, XP-010694784, pp. 16-23.

* cited by examiner

*Primary Examiner* — Harry Behm
(74) *Attorney, Agent, or Firm* — Birch, Stewart, Kolasch & Birch, LLP

(57) ABSTRACT

A Voltage Source Converter of M2LC-type has a series connection of switching cells (7), in which each switching cell has on one hand at least two semiconductor assemblies connected in series and having each a semiconductor device of turn-off type and a free-wheeling diode connected in parallel therewith and on the other at least one energy storing capacitor (20). The series connection of switching cells has one first end (61) connected to a direct voltage pole (5) on high voltage potential and an opposite end (62) connected to a phase output (10) of the converter. An arrangement (70) is configured to connect the phase output (10) to another said pole (6) on neutral voltage potential on a direct voltage side of the converter and to deliver voltage pulses to said phase output being both positive and negative with respect to said neutral potential.

20 Claims, 4 Drawing Sheets

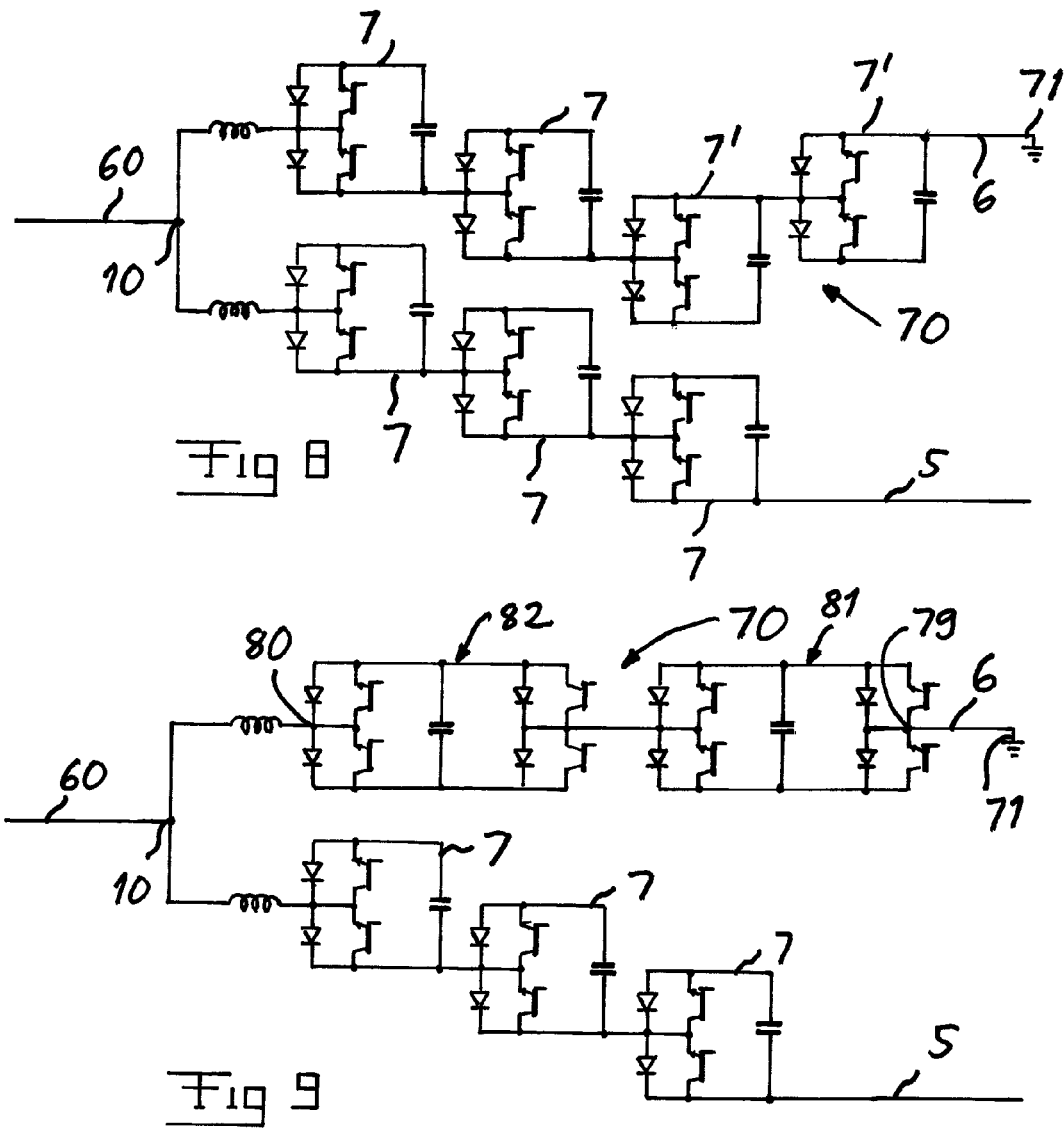

VOLTAGE SOURCE CONVERTER

TECHNICAL FIELD OF THE INVENTION AND BACKGROUND ART

The present invention relates to a Voltage Source Converter having at least one phase leg connecting to opposite poles of a direct voltage side of the converter and comprising a series connection of switching cells, each said switching cell having on one hand at least two semiconductor assemblies connected in series and having each a semiconductor device of turn-off type and a free-wheeling diode connected in parallel therewith and on the other at least one energy storing capacitor, a phase output of the converter being configured to be connected to an alternating voltage side of the converter being formed along said series connection of switching cells, each said switching cell being configured to obtain two switching states by control of said semiconductor devices of each switching cell, namely a first switching state and a second switching state in which the voltage across said at least one energy storing capacitor and a zero voltage, respectively, is applied across the terminals of the switching cell, for obtaining a determined alternating voltage on said phase output.

Such converters with any number of said phase legs are within the scope of this invention, but they have normally three such phase legs for having a three phase alternating voltage on the alternating voltage side thereof.

A Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back stations in which alternating voltage is firstly converted into direct voltage and this is then converted into alternating voltage, as well as in SVCS (Static Var Compensator), in which the direct voltage side consists of capacitors hanging freely. However, the present invention is not restricted to these applications, but other applications are also conceivable, such as in different types of drive systems for machines, vehicles etc.

A Voltage Source Converter of this type is known through for example DE 101 03 031 A1 and WO 2007/023064 A1 and is as disclosed there normally called a multi-cell converter or M2LC. Reference is made to these publications for the functioning of a converter of this type. Said switching cells of the converter may have other appearances than those shown in said publications, and it is for instance possible that each switching cell has more than one said energy storing capacitor, as long as it is possible to control the switching cell to be switched between the two states mentioned in the introduction.

Another Voltage Source Converter of this type is known through U.S. Pat. No. 5,642,275 used in a Static Var Compensator, in which the switching cells have a different appearance in the form of so-called full bridges, such as so-called H-bridges.

The present invention is primarily, but not exclusively, directed to such Voltage Source Converters configured to transmit high powers, and the case of transmitting high powers will for this reason mainly be discussed hereinafter for illuminating but not in any way restricting the invention thereto. When such a Voltage Source Converter is used to transmit high powers this also means that high voltages are handled, and the voltage of the direct voltage side of the converter is determined by the voltages across said energy storing capacitors of the switching cells. This means that a comparatively high number of such switching cells are to be connected in series for a high number of semiconductor devices, i.e. said semiconductor assemblies, are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one free-wheeling diode connected in anti-parallel therewith. This makes it possible to obtain substantially lower losses and also considerably reduces problems of filtering and harmonic currents and radio interferences, so that equipment therefor may be less costly.

Voltage Source Converters of this type already known assume symmetrical conditions, which means that the two poles of the direct voltage side thereof has the same voltage with respect to earth and the AC voltage is in between. However, in some cases it may be interesting to operate without transformers between said phase output of the converter and an alternating voltage network or line connected to said phase output, and if the alternating voltage from the converter is the same as the alternating voltage in said network there are normally no big problems to connect directly to the network.

However, known converters of the M2LC-type do not allow monopolar operation without any transformer or by just using an auto-connected transformer, so that a transformer with considerable costs associated therewith has then to be used in spite of the fact that the voltage levels on the direct voltage side and on the alternating voltage side of the converter would as such not require any transformer.

SUMMARY OF THE INVENTION

The object of the present invention is to provide a Voltage Source Converter of the type defined in the introduction enabling monopolar operation without any need of a transformer.

This object is according to the invention obtained by providing such a converter, in which one of said opposite poles is a high voltage potential pole connected to a high voltage potential on said direct voltage side and the other of said opposite poles is a neutral potential pole connected to a neutral voltage potential on said direct voltage side and in said series connection of switching cells has a first end thereof configured to be connected to said high voltage potential pole and a second end configured to be connected to said phase output, and the converter further comprises an arrangement configured to connect said phase output to said neutral potential pole and to deliver voltage pulses to said phase output being both positive and negative with respect to said neutral voltage potential.

By having the part of the converter which is connected between the high voltage potential on the direct voltage side and the phase output of the converter as a so-called valve branch of a M2LC-converter and by having the part of the converter which connects the phase output to the other pole constituted by an arrangement configured to be connected to a neutral potential and by allowing the voltage pulses delivered thereby to said phase output to be both positive and negative monopolar operation of a converter of this type may be carried out without any need of a transformer, so that costs may be saved. Thus, it will by this be possible to conduct current from said arrangement to said phase output as well as in the opposite direction.

It is pointed out that the alternating voltage applied on the phase output of the converter is formed by the potential difference of the voltage pulses of one sign applied from the high voltage potential pole and the voltage pulses, applied by said arrangement, where the voltage pulses applied from the high voltage potential pole are only positive or only negative and where the voltage pulses applied by said arrangement may be positive or negative.

Furthermore, it is pointed out that although a converter according to the present invention enables monopolar operation without any need of a transformer, a transformer, such as especially an auto-connected transformer, may be connected between said phase output and an alternating voltage network or line.

According to an embodiment of the invention said arrangement is symmetrical with respect to said neutral potential by being configured to deliver said voltage pulses with a same maximum magnitude on both sides, positive and negative, of said neutral potential. This is suitable for simple and reliable operation of the converter.

According to another embodiment of the invention said arrangement is configured to connect said phase output to said neutral potential pole by being connected to ground. This is a suitable way to define the neutral potential.

According to another embodiment of the invention the converter comprises a control unit adapted to control the converter for obtaining said determined alternating voltage on said phase output having a peak voltage of between ⅓ to ⅔, preferably about ½, of the high voltage potential on said high voltage potential pole with respect to ground. It has turned out that a relationship of about ½ for the peak alternating voltage to the voltage of said high voltage potential with respect to ground results in lowest possible costs for such a converter for a fixed power rating thereof.

According to another embodiment of the invention said arrangement is configured to deliver said voltage pulses to said phase output varying between maximum peak values with respect to said neutral potential substantially corresponding to a peak value of the alternating voltage to be delivered by the converter on said phase output. This configuration of said arrangement is preferable, especially when said relationship mentioned above prevails, since this will make it suitable to obtain the alternating voltage aimed at on said phase output by adding voltage pulses or potentials from the two valve branches of the converter resulting in voltage pulses for obtaining the alternating voltage aimed at.

According to another embodiment of the invention said arrangement comprises at least one H-bridge comprising two switching elements connected in parallel and each having at least two semiconductor assemblies connected in series and having each a semiconductor device of turn-off type and a free-wheeling diode connected in parallel therewith, the H-bridge also has at least one energy storing capacitor connected in parallel with said switching elements, and a mid point between semiconductor assemblies of a first of said switching elements is connected to said neutral potential and a mid point between semiconductor assemblies of a second switching element is connected to said phase output. An arrangement with the features needed for realizing the present invention may by simple and reliable means be obtained by the use of such H-bridges, which allow the voltage pulses delivered thereby to said phase output to go both positive and negative.

According to another embodiment of the invention the converter comprises a plurality of said H-bridges connected in series, and a mid point of a first switching element at one end of said series connection of H-bridges is configured to be connected to said neutral potential and a mid point of a second switching element at the opposite end of said series connection of H-bridges is configured to be connected to said phase output. It is by this possible to select a desired number of such H-bridges for obtaining an appropriate selection of voltage levels of the voltage pulses delivered to the phase output thereby for reducing losses of the converter and obtaining an alternating voltage with a desired shape.

According to another embodiment of the invention said arrangement comprises at least two of said switching cells connected in series. It may be advantageous to use such switching cells for obtaining different levels of said voltage pulses.

According to another embodiment of the invention the series connection of switching cells in said arrangement comprises switching cells which are oppositely directed with respect to the voltage provided by said energy storing capacitor thereof. This would make it possible to utilize such a series connection of switching cells for obtaining an arrangement allowing the voltage pulses delivered thereby to go both positive and negative. It is then preferred that said arrangement has the series connection of switching cells with half of the switching cells directed in one direction and the other half thereof directed in the opposite direction with respect to the voltage provided by said energy storing capacitor thereof.

Although it is possible to have only a series connection of switching cells and no said H-bridges in said arrangement it is possible to combine such switching cells and H-bridges, and in another embodiment of the invention said arrangement comprises a series connection of one or more said H-bridges and one or more of said switching cells, and the one end of this series connection is configured to be connected to said neutral potential and the other end thereof is configured to be connected to said phase output.

According to another embodiment of the invention the number of the switching cells of said series connection of switching cells between the high voltage potential pole and the phase output of said phase leg is ≧4, ≧12, ≧30 or ≧50. A converter of this type is, as already mentioned above, particularly interesting when the number of switching cells in a said series connection is rather high resulting in a high number of possible levels of the voltage pulses delivered on the phase output.

According to another embodiment of the invention said semiconductor devices of said semiconductor assemblies are IGBTs (Insulated Gate Bipolar Transistor), IGCTs (Integrated Gate Commutated Thyristor) or GTOs (Gate Turn-Off Thyristor). These are suitable semiconductor devices for such converters, although other semiconductor devices of turn-off type are also conceivable.

According to another embodiment of the invention said converter is configured to have said direct voltage side connected to a direct voltage network for transmitting High Voltage Direct Current (HVDC) and the alternating voltage side connected to an alternating voltage phase line belonging to an alternating voltage network. This is due to the high number of semiconductor assemblies required therefor a particularly interesting application of a converter of this type.

According to another embodiment of the invention the converter is configured to have a direct voltage across said two poles being between 1 kV and 1200 kV or between 10 kV and 1200 kV or between 100 kV and 1200 kV. The invention is the more interesting the higher said direct voltage is.

The invention also relates to a plant for transmitting electric power according to the appended claim therefor. The stations of such a plant may be given attractive dimensions and a high reliability to a comparatively low cost.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIGS. 8 and 9 are views corresponding to FIG. 6 of converters according to a second and a third embodiment of the invention, respectively.

DETAILED DESCRIPTION OF EMBODIMENTS OF THE INVENTION

Figure 1:
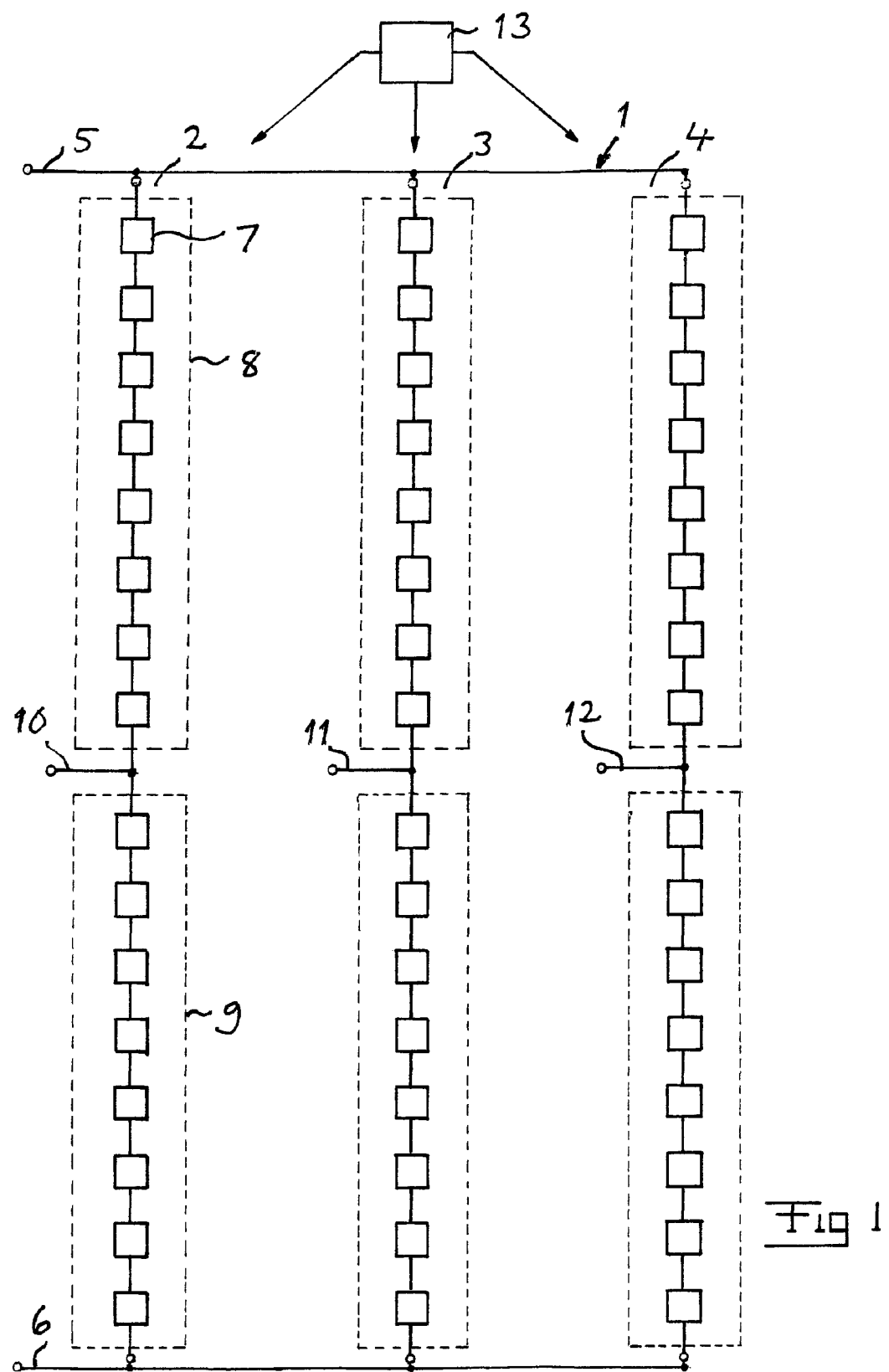
FIG. 1 is a very simplified view of a Voltage Source Converter of the type according to the present invention.

FIG. 1 illustrates very schematically the general construction of a Voltage Source Converter 1 of the type to which the present invention relates. This converter has three phase legs 2-4 connected to opposite poles 5, 6 of a direct voltage side of the converter, such as a direct voltage network for transmitting high voltage direct current. Each phase leg comprises a series connection of switching cells 7 indicated by boxes, in the present case 16 to the number, and this series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control unit 13 is arranged for controlling the switching cells 7 and by that the converter to convert direct voltage into alternating voltage and conversely.

Figure 2:
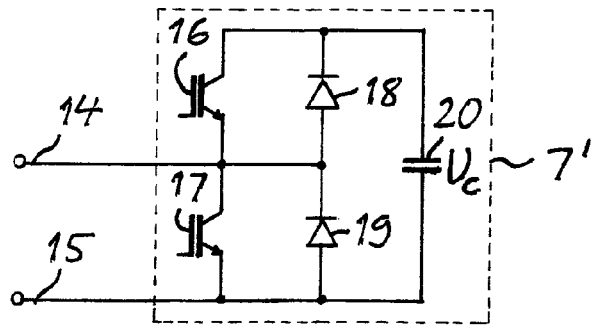
FIGS. 2 and 3 illustrate two different known switching cells, which may be a part of the Voltage Source Converter according to the invention.
Figure 3:
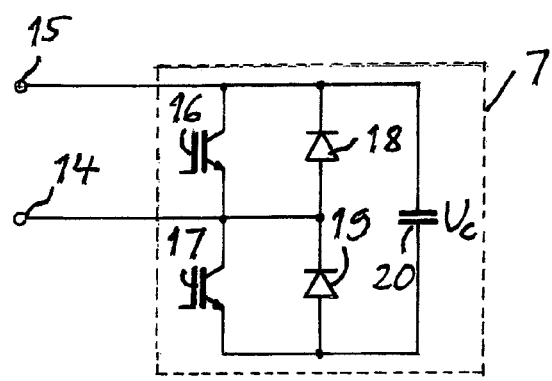

The Voltage Source Converter has switching cells 7 of the type having on one hand at least two semiconductor assemblies with each a semiconductor device of turn-off type, and a free-wheeling diode connected in parallel therewith and on the other at least one energy storing capacitor, and two examples 7, 7' of such switching cells are shown in FIG. 2 and FIG. 3. The terminals 14, 15 of the switching cells are adapted to be connected to adjacent switching cells in the series connection of switching cells forming a phase leg. The semiconductor devices 16, 17 are in this case IGBTs connected in parallel with diodes 18, 19. Although only one semiconductor device and one diode is shown per assembly these may stand for a number of semiconductor devices and diodes, respectively, connected in parallel for sharing the current flowing through the assembly. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching cells shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching cells are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
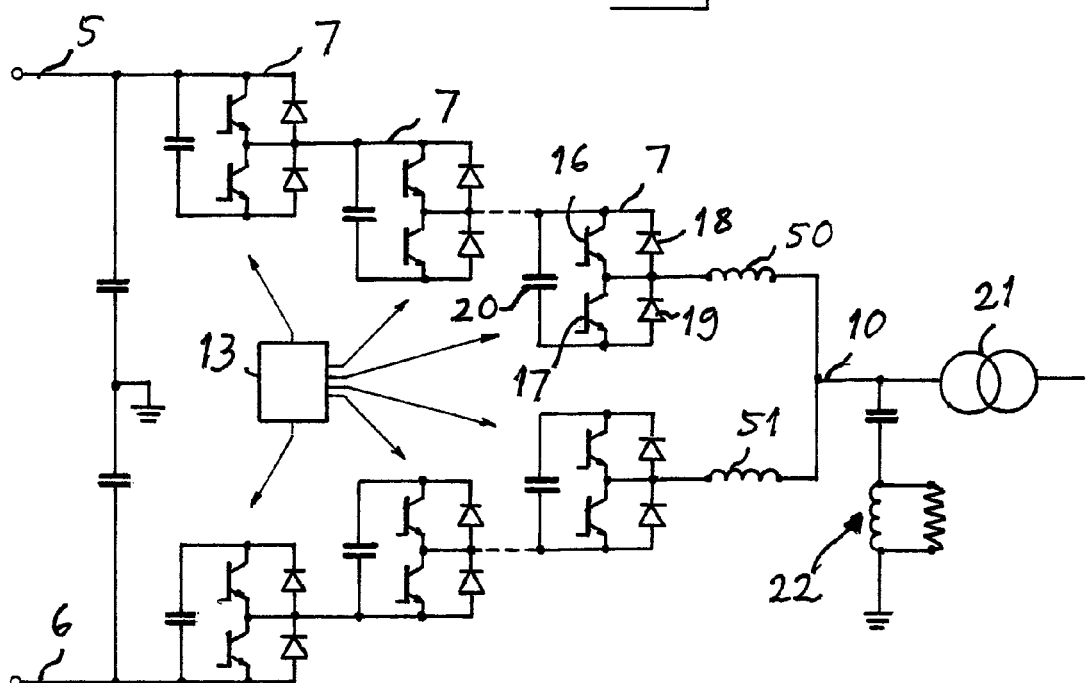
FIG. 4 is a simplified view very schematically illustrating a known Voltage Source Converter of the type according to the invention.

FIG. 4 shows a little more in detail how the phase leg 2 of the converter according to FIG. 1 is formed by switching cells of the type shown in FIG. 3, in which totally ten switching cells have been left out for simplifying the drawing. The control unit 13 is adapted to control the switching cells by controlling the semiconductor devices thereof, so that they will either deliver a zero voltage or the voltage across the capacitor to be added to the voltages of the other switching cells in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

Figure 5:
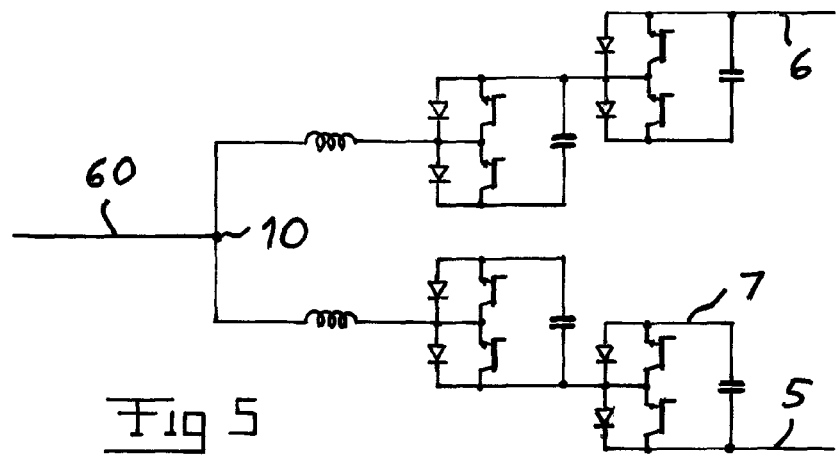
FIG. 5 is a view similar to FIG. 4 of a known Voltage Source Converter of the type according to the present invention having no transformer.

FIG. 5 illustrates schematically a Voltage Source Converter of the type shown in FIG. 1 configured to assume symmetrical conditions, i.e. the two poles 5, 6 have the same voltage and the alternating voltage is in between. This design allows a connection of the phase output 10 to an alternating voltage network 60 without any transformer as long as bipolar operation is possible. However, monopolar operation, which may be necessary or desired upon occurrence of a fault, is not possible.

Figure 6:
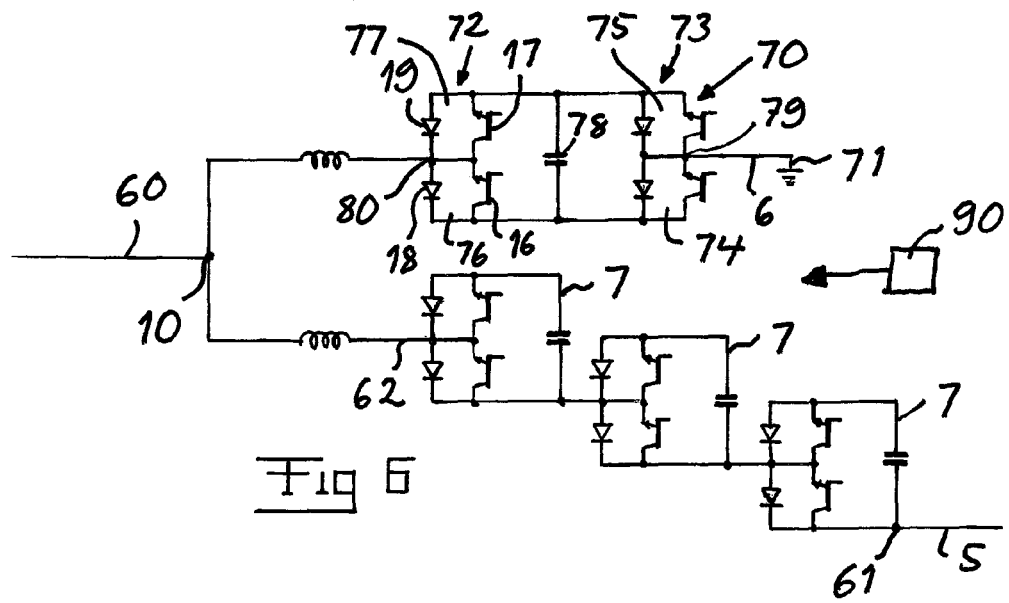
FIG. 6 is a view similar to FIG. 5 of a Voltage Source Converter according to a first embodiment of the invention.

FIG. 6 schematically illustrates a Voltage Source Converter according to a first embodiment of the invention enabling mono-polar operation without the need of any transformer for connecting said phase output 10 to an alternating voltage network 60. This converter has a series connection of switching cells 7 of the type shown in FIG. 3 with one first end 61 thereof configured to be connected to said pole 5 on high voltage potential on the direct voltage side of the converter and another opposite second end 62 configured to be connected to said phase output 10. The converter further comprises an arrangement 70 configured to connect said phase output 10 to the other said pole 6 on neutral voltage potential, here ground by being earthed at 71, on said direct voltage side of the converter and to deliver voltage pulses to said phase output being both positive and negative with respect to said neutral potential (ground). The arrangement 70 comprises here a H-bridge or full bridge comprising two switching elements 72, 73 connected in parallel and each having two semiconductor assemblies 74-77 connected in series and having each a semiconductor device 16, 17 of turn-off type and a free-wheeling diode 18, 19 connected in parallel therewith. The H-bridge has also at least one energy storing capacitor 78 connected in parallel with said switching elements.

A mid point 79 between semiconductor assemblies of a first 72 of said switching elements is connected to ground 71 and a mid point 80 between semiconductor assemblies of another, second switching element 73 is connected to the phase output 10.

Figure 7:
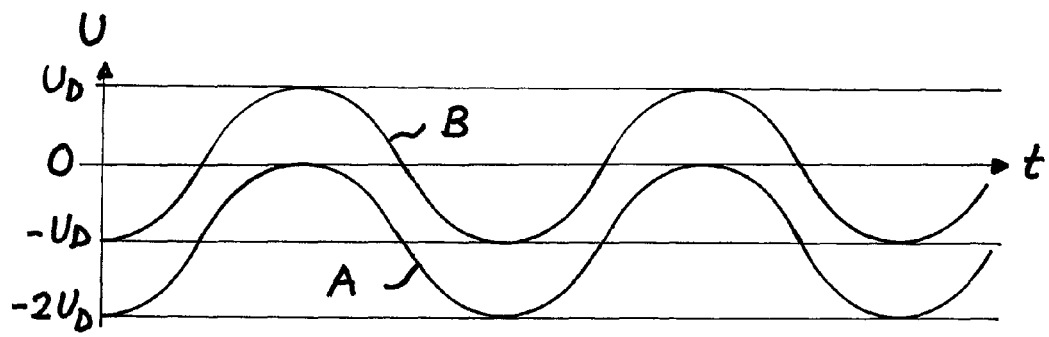
FIG. 7 is a diagram of voltages applied on the phase output of the converter according to FIG. 6 versus time.

Reference is now also made to FIG. 7. A control unit 90 (see FIG. 6) is configured to control the semiconductor devices of the switching cells 7 of the upper valve branch and the semiconductor devices of the H-bridge so as to obtain an alternating voltage aimed at on said phase output 10. It is very schematically illustrated in FIG. 7 how the voltage pulses A delivered by the upper valve branch may vary between 0 and a maximum high voltage potential ($-2\ U_D$) being here approximately twice the peak alternating voltage on the phase output 10 and by that on the alternating voltage network 60. The curve B schematically shows the voltage delivered from the H-bridge to the phase output 10 and how this may go both positive ($U_D$) and negative ($-U_D$). The difference between these two curves will form the alternating voltage on the alternating voltage network 60 and will here accordingly correspond to the curve B.

Accordingly, the converter according to FIG. 6 enables monopolar operation and conducting current in both directions in the neutral potential pole 6 thereof without any need of any transformer between the converter and the alternating voltage network 60.

Simulations for monopolar operation of a converter shown in FIG. 6 have been carried out, and it has turned out that the energy storing capacitors thereof will remain stable during such operation.

Furthermore, it has been calculated that the cost of the converter according to FIG. 6 for a determined rated power will have a minimum when the control unit 90 is configured to control the converter for obtaining an alternating voltage on the phase output having a peak voltage of about ½ of the high voltage potential on the pole 5.

FIG. 8 illustrates very schematically a Voltage Source Converter according to a second embodiment of the invention, in which said arrangement 70 comprises a series connection of switching cells, in which half 7' of the switching cells are directed in one direction and the other half 7 thereof in the opposite direction with respect to the voltage thereof provided by said energy storing capacitor. Such an arrangement also allows voltage pulses being both positive and negative to be supplied to the phase output 10.

FIG. 9 illustrates schematically a Voltage Source Converter according to a third embodiment of the invention, in which said arrangement 70 comprises a series connection of two H-bridges 81, 82, in which one end 79 of this series connection is configured to be connected to ground 71 and the other end 80 thereof configured to be connected to the phase output 10. This embodiment makes it possible to obtain more voltage levels than the embodiment shown in FIG. 6 and by that a better shape of the alternating voltage curve on the alternating voltage network.

It is pointed out that the converters are also associated with filter equipment and other means having nothing to do with the present invention and which have for that sake been left out in the Figures.

The invention is of course not in any way restricted to the embodiments described above, but many possibilities to modifications thereof will be apparent to a person with ordinary skill in the art without departing from the scope of the invention as defined in the appended claims.

It is for instance possible to have a different number of H-bridges or switching cells connected in series than shown in FIGS. 8 and 9, and it is also possible to combine one or more such switching cells with one or more H-bridges in an arrangement in a converter according to the invention.

The number of the switching cells connected in series in the valve branch interconnecting the high voltage potential pole and the phase output may also be any other than shown in the Figures.

According to an embodiment of the invention said phase output is configured to be directly connected to an alternating voltage network and according to another embodiment of the invention said phase output is configured to be connected to an auto-controlled transformer connecting to an alternating voltage network.

The invention claimed is:

1. A Voltage Source Converter having at least one phase leg connecting to opposite poles of a direct voltage side of the converter and comprising a series connection of M2LC converter valve branch switching cells, each said switching cell having at least two semi-conductor assemblies connected in series, a phase output of the converter being configured to be connected to an alternating voltage side of the converter being formed along said series connection of switching cells, each said switching cell being configured to obtain two switching states by control of said semiconductor devices of each switching cell, namely a first switching state and a second switching state in which the voltage across at least one energy storing capacitor and a zero voltage, respectively, is applied across the terminals of the switching cell, for obtaining a determined alternating voltage on said phase output, wherein one of said opposite poles is a high voltage potential pole connected to a high voltage potential on said direct voltage side and the other of said opposite poles is a neutral potential pole connected to a neutral voltage potential on said direct voltage side and said series connection of switching cells has a first end thereof configured to be connected to said high voltage potential pole and a second end configured to be connected to said phase output, wherein the converter further comprises an arrangement configured to connect said phase output to said neutral position pole and to deliver voltage pulses to said phase output being both positive and negative with respect to said neutral voltage potential, the arrangement comprising:

at least one H-bridge comprising two switching elements connected in parallel and each having at least two semi-conductor assemblies connected in series and having each a semiconductor device of turn-off type and a free-wheeling diode connected in parallel therewith, said H-bridge also having at least one energy storing capacitor connected in parallel with said switching elements, and a mid point between semiconductor assemblies of a first of said switching elements is connected to said neutral potential and a mid point between semiconductor assemblies of a second of said switching elements is connected to said phase output and/or at least two of said switching cells connected in series, which switching cells are oppositely directed with respect to the voltage provided by said energy storing capacitor thereof, and a control unit configured to control the converter for obtaining said determined alternating voltage on said phase output having a peak voltage of between ⅓ to ⅔, preferably about ½, of the high voltage potential on said high voltage potential pole with respect to ground and controlling the arrangement to deliver said voltage pulses to said phase output varying between maximum peak values with respect to said neutral potential substantially corresponding to a peak value of the alternating voltage to be delivered by the converter on said phase output.

2. A converter according to claim 1, wherein said arrangement is symmetrical with respect to said neutral potential by being configured to deliver said voltage pulses with a same maximum magnitude on both sides, positive and negative, of said neutral potential.

3. A converter according to claim 2, wherein said arrangement is configured to connect said phase output to said neutral potential pole by being connected to ground.

4. A converter according to claim 2, wherein it comprises a plurality of said H-bridges connected in series, and that a mid point of a first switching element at one end of said series connection of H-bridges is configured to be connected to said neutral potential and a mid point of a second switching element at the opposite end of said series connection of H-bridges is configured to be connected to said phase output.

5. A converter according to claim 2, wherein said arrangement has a series connection of switching cells with half of the switching cells directed in one direction and the other half thereof directed in the opposite direction with respect to the voltage provided by said energy storing capacitor thereof.

6. A converter according to claim 2, wherein said arrangement comprises a series connection of one or more said H-bridges and one or more of said switching cells, and one end of this series connection is configured to be connected to said neutral potential and the other end thereof is configured to be connected to said phase output.

7. A converter according to claim 1, wherein said arrangement is configured to connect said phase output to said neutral potential pole by being connected to ground.

8. A converter according to claim 7, wherein it comprises a plurality of said H-bridges connected in series, and that a mid point of a first switching element at one end of said series connection of H-bridges is configured to be connected to said neutral potential and a mid point of a second switching element at the opposite end of said series connection of H-bridges is configured to be connected to said phase output.

9. A converter according to claim 7, wherein said arrangement has a series connection of switching cells with half of the switching cells directed in one direction and the other half thereof directed in the opposite direction with respect to the voltage provided by said energy storing capacitor thereof.

10. A converter according to claim 7, wherein said arrangement comprises a series connection of one or more said H-bridges and one or more of said switching cells, and that one end of this series connection is configured to be connected to said neutral potential and the other end thereof is configured to be connected to said phase output.

11. A converter according to claim 1, wherein the arrangement comprises a plurality of said H-bridges connected in series, and that a mid point of a first switching element at one end of said series connection of H-bridges is configured to be connected to said neutral potential and a mid point of a second switching element at the opposite end of said series connection of H-bridges is configured to be connected to said phase output.

12. A converter according to claim 11, wherein said arrangement has a series connection of switching cells with half of the switching cells directed in one direction and the other half thereof directed in the opposite direction with respect to the voltage provided by said energy storing capacitor thereof.

13. A converter according to claim 11, wherein said arrangement comprises a series connection of one or more said H-bridges and one or more of said switching cells, and that one end of this series connection is configured to be connected to said neutral potential and the other end thereof is configured to be connected to said phase output.

14. A converter according to claim 1, wherein said arrangement has a series connection of switching cells with half of the switching cells directed in one direction and the other half thereof directed in the opposite direction with respect to the voltage provided by said energy storing capacitor thereof.

15. A converter according to claim 1, wherein said arrangement comprises a series connection of one or more said H-bridges and one or more of said switching cells, and that one end of this series connection is configured to be connected to said neutral potential and the other end thereof is configured to be connected to said phase output.

16. A converter according to claim 1, wherein the number of the switching cells of said series connection of switching cells between the high voltage potential pole and the phase output of said phase leg is $\geq 4$, $\geq 12$, $\geq 30$ or $\geq 50$.

17. A converter according to claim 1, wherein said semiconductor devices of said semiconductor assemblies are IGBTs (Insulated Gate Bipolar Transistor), IGCTs (Integrated Gate Commutated Thyristor) or GTO's (Gate Turn-Off Thyristor).

18. A converter according to claim 1, wherein it is configured to have said direct voltage side connected to a direct voltage network for transmitting High Voltage Direct Current (HVDC) and the alternating voltage side connected to an alternating voltage phase line belonging to an alternating voltage network.

19. A converter according to claim 1, wherein it is configured to have a direct voltage across said two poles being between 1 kV and 1200 kV or between 10 kV and 1200 kV or between 100 kV and 1200 kV.

20. A plant for transmitting electric power comprising a direct voltage network and at least one alternating voltage network connected thereto through a station, said station being adapted to perform transmitting of electric power between the direct voltage network and the alternating voltage network and comprising at least one Voltage Source Converter adapted to convert direct voltage into alternating voltage and conversely, wherein said station of the plant comprises a Voltage Source Converter according to claim 1.

* * * * *